United States Patent [19]

Barber, Jr. et al.

[11] 4,435,738

[45] Mar. 6, 1984

[54] MULTILAYER CERAMIC CAPACITORS

[75] Inventors: Flavil Barber, Jr., Simpsonville; Emmanuel E. Karam, Greenville; Richard Dunaway, Mauldin; Ray L. Rogers, Williamston, all of S.C.

[73] Assignee: Union Carbide Corporation, Danbury, Conn.

[21] Appl. No.: 267,443

[22] Filed: May 27, 1981

[51] Int. Cl.³ .................... H01G 4/12; H01G 13/00
[52] U.S. Cl. ......................... 361/321; 29/25.42
[58] Field of Search ............... 361/304, 321; 29/25.42

[56] References Cited

U.S. PATENT DOCUMENTS

| 3,456,313 | 7/1969 | Rodriguez . | |
|---|---|---|---|
| 4,008,514 | 2/1977 | Eldorbaum | 361/321 X |
| 4,081,857 | 3/1978 | Hanold | 361/321 |
| 4,082,906 | 4/1978 | Amin et al. | 361/321 X |

FOREIGN PATENT DOCUMENTS 243925 2/1947 Switzerland ............... 361/304

Primary Examiner—Donald A. Griffin
Attorney, Agent, or Firm—Frederick J. McCarthy, Jr.

[57] ABSTRACT

A multilayer ceramic capacitor is provided which is formed from ceramic sheets having electrodes on opposite surfaces which are separated by non-electroded ceramic sheets.

2 Claims, 8 Drawing Figures

DP = DOUBLE PRINT

SP = SINGLE PRINT

B = BLANK
DP = DOUBLE PRINT

MULTILAYER CERAMIC CAPACITORS

The present invention relates to multilayer ceramic capacitors and a method of making multilayer ceramic capacitors.

Multilayer ceramic capacitors such as described in U.S. Pat. No. 3,815,187 are widely used in the electronics industry in applications requiring high reliability and small capacitor size.

The general procedure for manufacturing multilayer ceramic capacitors involves the preparation of thin sheets of "green" ceramic for example by compressing barium titanate particles and binder. The green ceramic sheet is "electroded" by printing or otherwise forming metal electrode patterns on the sheet. The electrode patterns are cut, e.g. punched from the electroded sheet and a confined stack of electroded green ceramic plates is formed, e.g., in a die. The confined stack is pressed into a coherent body which is subsequently fired to mature the ceramic and, with suitable terminal connections, form the finished multilayer, multielectrode capacitor. A detailed description of multilayer ceramic capacitor manufacture is disclosed in U.S. Pat. No. Re. 26,421 (7/2/1968), U.S. Pat. No. 3,456,313 (7/22/1969), and U.S. Pat. No. 3,546,776 (12/15/1970).

In the manufacture of multilayer ceramic capacitors, a significant portion of the cost involves the die-punching operation and electrode metal usage. The die-punching equipment requires continuous high speed and dimensional precision and the usual electrode metals are expensive, e.g., silver-palladium alloys.

It is accordingly an object of the present invention to provide an improved method of making multilayer ceramic capacitors.

Other objects will be apparent from the following description and claims taken in conjunction with the drawings wherein:

Figure 4C:
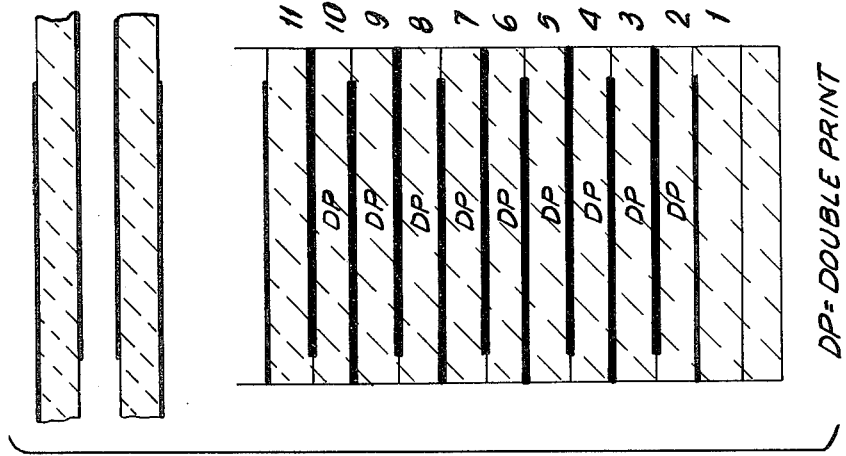
Figure 4B:
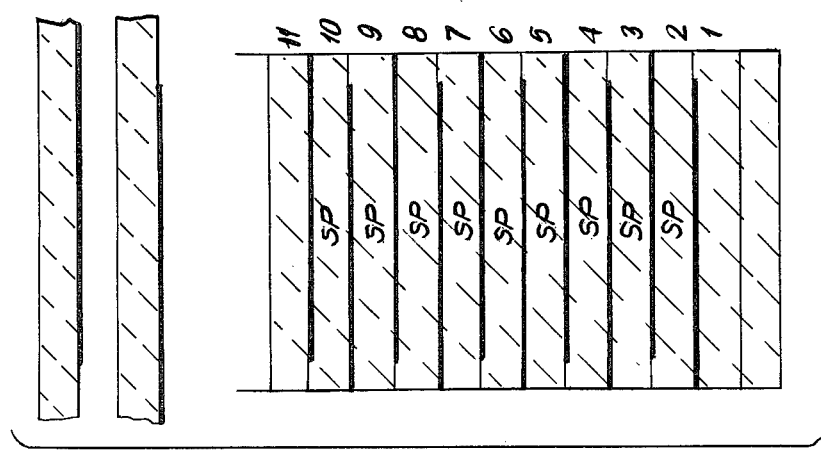
Figure 4A:
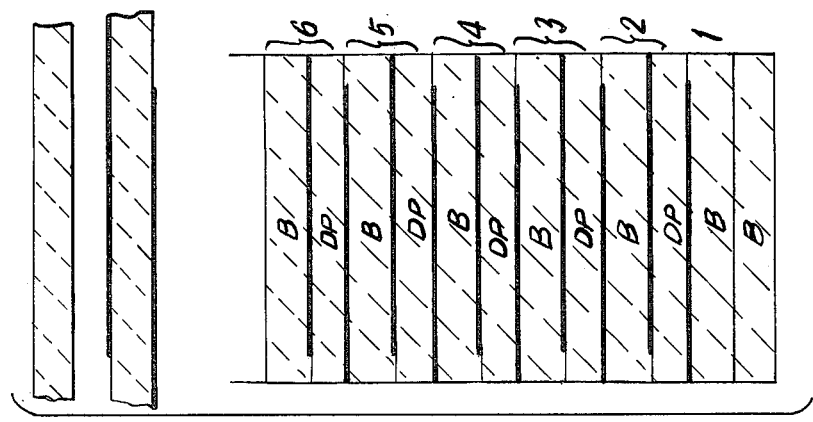

FIGS. 4(a)-(c) show a comparison of the present invention with prior art techniques.

A method in accordance with the present invention for making multilayer ceramic capacitors comprises providing a first electroded green ceramic sheet having a plurality of electrodes of a predetermined desired size on both of the opposite surfaces of the first sheet. The electrodes on one surface of the green ceramic sheet are opposite an electrode on the other surface of the sheet and opposing electrodes are in register except at selected opposite edge portions. A second non-electroded green ceramic sheet is provided closely adjacent and opposite a surface of the electroded green ceramic sheet. The first electroded and second non-electroded sheets are cut to form a confined stack of a plurality, 10 or more, of green ceramic plates. In the stack there are alternate electroded green ceramic plates and between the electroded green ceramic plates there is a non-electroded green ceramic plate. The confined stack, following techniques well known in the art, is laminated by being subjected to pressure to form a coherent green ceramic body which is fired to maturity. In the resulting product, the alternate out of register electrode edges are used to establish electrical connection with suitable terminations as is well known in the art.

Figure 1:
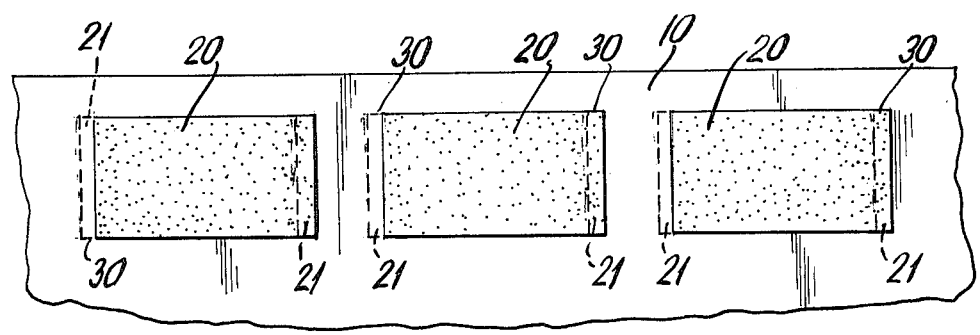
FIG. 1 shows an electroded green ceramic sheet of the type used in the present invention.

The present invention will be more fully understood with reference to the drawing. With reference to FIG. 1, a conventional "green" ceramic sheet is shown at 10. A plurality of metal electrodes on one surface of the ceramic sheet are shown at 20. For example, the electrodes can be of a palladium-silver alloy which have been screen printed on the green ceramic sheet following well known conventional techniques. On the opposite surface of the ceramic sheet 10 are similar electrodes 21 which are in register with electrodes 20 except for the slight offset 30.

Figure 3:
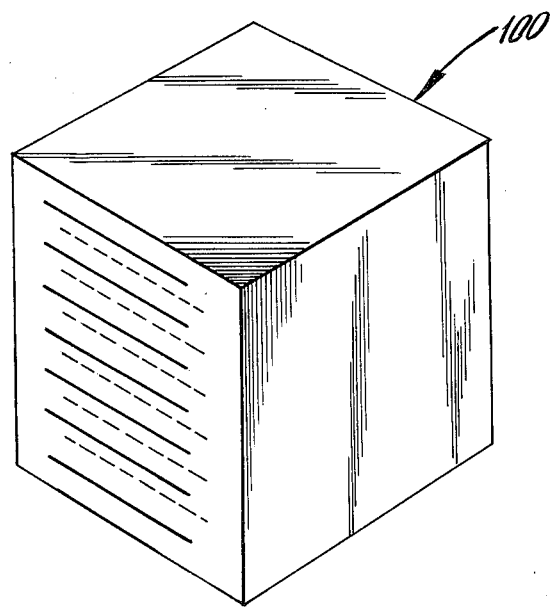
FIG. 3 shows a multilayer ceramic capacitor body.
Figure 2:
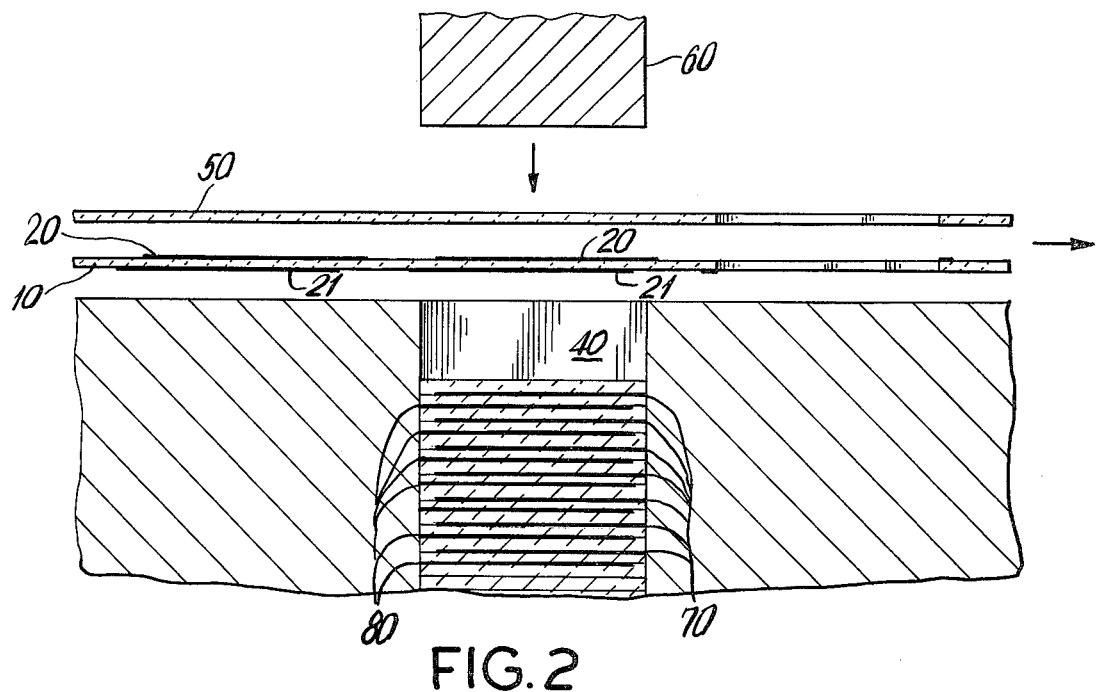
FIGS. 2, 2(a) and 2(b) illustrate the making of a multilayer capacitor in accordance with the present invention.

In the practice of the present invention, with reference to FIG. 2, the electroded green ceramic sheet 10 is conventionally moved over die cavity 40 together with a closely adjacent non-electroded green ceramic sheet 50, e.g., the same as sheet 10 except for electroding. Punch 60 simultaneously punches sheets 10 and 50 to cut out and provide a confined stack of green ceramic plates to die cavity 40. Plates 70 are electroded on both surfaces. Plates 80 are non-electroded. Edge portions of alternate electrodes are exposed by the punching operation to provide electrical connections to the final capacitor body following the customary practice. When the desired number of plates has been punched into the die cavity 40, the confined stack is, following known techniques, subjected to pressure to form a coherent body such as shown at 100 in FIG. 3 which is fired to mature the ceramic following well known techniques.

Figure 2A:
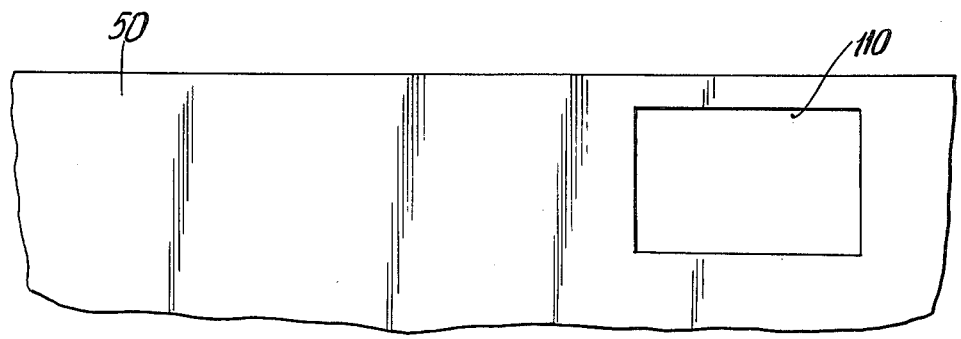
Figure 2B:
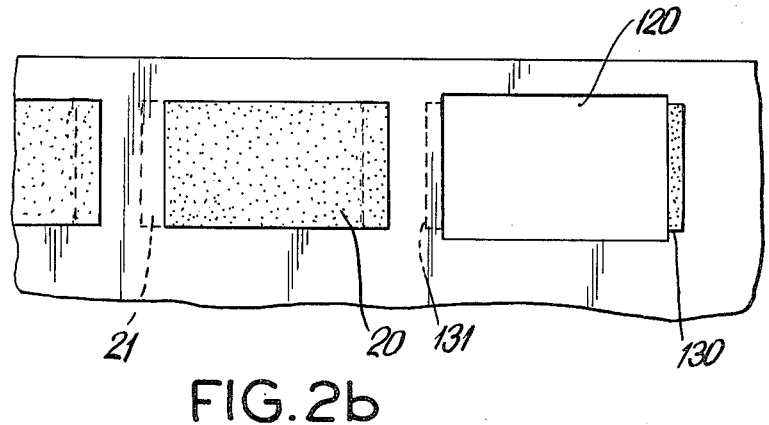

FIG. 2(a) shown at 110 the punched-out portion of the non-electroded sheet 50 which provided a non-electroded green ceramic plate 80. FIG. 2(b) shows at 120 the punched-out portion which provided an electroded green ceramic plate 70 having opposed electrodes on each surface. In FIG. 2(b), unused and recyclable electrode metal on green ceramic sheet 10 is shown at 130, 131.

With reference to FIG. 4, FIG. 4(a) represents a stack of green ceramic plates provided by the practice of the present invention. As shown in FIG. 4(a) six (6) punchings were required to assemble the stack. In FIG. 4(b), the usual prior art technique of using green ceramic sheet electroded on only one side required eleven (11) punchings, about twice as many as the present invention to get a comparable stack. FIG. 4(c) illustrates a prior art technique using electrodes on both sides of a green ceramic sheet but not using a non-electroded sheet. Eleven (11) punchings are also required in this case and also twice as much electrode metal is used as compared to the present invention to obtain a comparable stack.

The following example will further illustrate the present invention:

EXAMPLE

A ceramic slip made up substantially of 80 wt. % $BaTiO_3$, 14 wt. % bismuth titanate and 6 wt. % calcium zirconate powders mixed with about 7% polyvinyl alcohol and sufficient water to make a flowable slip was cast into green ceramic sheet approximately 1 mil thick.

A pattern of first electrodes was printed on the top surface of the green ceramic sheet. Each electrode was 0.235" wide and 0.250" long. The printing was performed by the silk screen method using an ink containing 35% Pd - 65% Ag powder mixed with organic ink vehicles. A second electrode pattern was printed by the same method on the other side of the green ceramic sheet. Each second electrode overlapped precisely the width dimension of the first electrode and was offset in the length direction by 0.05".

A second green ceramic sheet the same as the first sheet but without printed electrodes was laid against the first sheet and the two sheets simultaneously were punched into a die cavity having a cross-section 0.258" long by 0.285" wide. Thirty-four (34) such double layers of green ceramic sheets were punched and the resulting green ceramic plates were stacked into the cavity; then the entire stack was compressed at a pressure of 40,000 psi for 20 seconds. Prior to and after punching the double layer of sheets, unelectroded ceramic sheet was punched into the die to provide two unelectroded green ceramic plates at the bottom and top of the stack. The stacked capacitor chip was fired for four hours at above 1000° C. to a maximum temperature of 1130° C. to mature the green ceramic. Silver paste terminations were applied to the ends of the resulting fired capacitor chip to contact the various individual electrode layers. The resulting capacitor, having 68 electrodes had a capacitance of 1 uF, a dissipation factor of about 1.5% and an insulation resistance above 2000 megohms.

Through the practice of the present invention increased output of the stacking equipment is obtained with longer life of the cutting dies. The use of the non-electroded green ceramic sheet does not require precision alignment or marking and hence complicated expensive equipment is not needed and the non-electroded scrap green ceramic sheet can be directly recycled. Also, the electroded scrap sheet, being separate and double electrode printed, has an increased metal to ceramic ratio which reduces the bulk of the recyclable metal bearing scrap.

In the practice of the present invention conventional ceramic material can be used in the green ceramic sheet, e.g., single and multiple oxides or oxide precursors of barium, titanium, aluminum, zirconium, strontium, calcium, bismuth, neodymium, magnesium, manganese, cobalt, nickel, tin, silicon, tantalum, niobium and the like. Also, in the present invention, conventional electrode materials can be used, e.g., platinum, palladium, gold, silver, nickel, cobalt, copper, and the like, and the usual techniques can be used for electroding the green ceramic sheet, e.g., silk screen printing, spraying, sputtering, vapor depositing.

What is claimed is:

1. Method of forming a ceramic capacitor which comprises providing an electroded ceramic sheet capable of being handled and cut into stackable plates having a plurality of electrodes of a predetermined size on both of the opposite surfaces of said sheet with electrodes on one surface being in register with electrodes on the other surface except at selected opposite edge portions; providing a separate non-electroded green ceramic sheet capable of being handled and cut into stackable plates which is the same as the electroded ceramic sheet except for the absence of electrodes' said non-electroded green ceramic sheet having a surface thereof closely adjacent and opposite a surface of said electroded green ceramic sheet; simultaneously cutting, and stacking and laminating said adjacent separate electroded and non-electroded sheets to form a stack of separate electroded and non-electroded green ceramic plates with alternate electroded green ceramic plates having opposing electrodes thereon exposed at opposite edges and said alternate electroded plates being separated by a non-electroded green ceramic plate; and firing said body to mature the green ceramic.

2. An unfired green ceramic capacitor body comprising a stack of separate green ceramic plates of the same thickness, alternate plates having opposing electrodes thereon and said alternate plates being separated by a plate of non-electroded green ceramic.

* * * * *